United States Patent
Inoue

(10) Patent No.: US 11,512,197 B2
(45) Date of Patent: Nov. 29, 2022

(54) RESIN COMPOSITION AND METHOD FOR PRODUCING SAME

(71) Applicant: THE NIPPON SYNTHETIC CHEMICAL INDUSTRY CO., LTD., Osaka (JP)

(72) Inventor: Kota Inoue, Osaka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 0 days.

(21) Appl. No.: 16/004,531

(22) Filed: Jun. 11, 2018

(65) Prior Publication Data

US 2018/0291192 A1 Oct. 11, 2018

Related U.S. Application Data

(63) Continuation of application No. PCT/JP2016/085897, filed on Dec. 2, 2016.

(30) Foreign Application Priority Data

Dec. 17, 2015 (JP) .................. JP2015-246080

(51) Int. Cl.
*C08L 29/04* (2006.01)
*C08J 3/00* (2006.01)
*C08J 3/12* (2006.01)

(52) U.S. Cl.
CPC ............. *C08L 29/04* (2013.01); *C08J 3/005* (2013.01); *C08J 3/12* (2013.01); *C08J 2329/04* (2013.01); *C08J 2477/02* (2013.01)

(58) Field of Classification Search
CPC ....... C08L 29/04; C08L 77/02; C08J 2329/04; C08J 2477/02; C08G 69/14; C08G 69/16;
(Continued)

(56) References Cited

U.S. PATENT DOCUMENTS 4,053,457 A * 10/1977 Cordes .................. C08G 69/16 528/323
4,795,781 A 1/1989 Miyamoto et al.
(Continued)

FOREIGN PATENT DOCUMENTS

CN 1898088 A 1/2007
DE 3637446 A1 5/1987
(Continued)

OTHER PUBLICATIONS

European Office Action, European Patent Office, Application No. 16875427.3, dated Jul. 23, 2019, 7 pages.
(Continued)

*Primary Examiner* — Kregg T Brooks
(74) *Attorney, Agent, or Firm* — Greenblum & Bernstein, P.L.C.

(57) ABSTRACT

The purpose of the present invention is to establish a more precise method for evaluating long-run moldability and, based on this method, improve long-run moldability of a resin composition containing an EVOH-based resin and a nylon 6-based polyamide. Provided is a resin composition having improved long-run moldability and containing an EVOH-based resin and a nylon 6-based polyamide, wherein the amount of ε-caprolactam is 200 ppm or less. When the resin composition comprises an EVOH-based resin and a nylon 6-based polyamide, contacting the resin composition with water can reduce the amount of ε-caprolactam.

5 Claims, 1 Drawing Sheet

(58) Field of Classification Search
CPC .... C08G 69/46; C09D 177/02; C09D 129/04; C09J 177/02; C09J 129/04; C08F 16/06
See application file for complete search history.

(56) References Cited

U.S. PATENT DOCUMENTS

| | | | | |
|---|---|---|---|---|
| 5,268,134 | A * | 12/1993 | Burlett | B29D 23/001 264/209.6 |
| 3,039,114 | A1 | 10/2011 | Masumoto et al. | |
| 2005/0009987 | A1 | 1/2005 | Hara et al. | |
| 2007/0148481 | A1 | 6/2007 | Onishi | |
| 2014/0256887 | A1 * | 9/2014 | Kory | C08G 69/06 525/420 |
| 2014/0350213 | A1 * | 11/2014 | El-Toufaili | C08L 77/06 528/323 |
| 2016/0221314 | A1 * | 8/2016 | Kawai | C08L 29/04 |

FOREIGN PATENT DOCUMENTS

| | | |
|---|---|---|
| JP | S62-022840 A | 1/1987 |
| JP | 62-106944 A | 5/1987 |
| JP | H07-118470 A | 5/1995 |
| JP | 3440124 B2 | 8/2003 |
| JP | 2005-146250 A | 6/2005 |
| JP | 2005-178324 A | 7/2005 |
| JP | 2009-191255 A | 8/2009 |

OTHER PUBLICATIONS

International Search Report issued with respect to Application No. PCT/JP2016/085897, dated Feb. 14, 2017.
International Preliminary Report on Patentability issued with respect to Application No. PCT/JP2016/085897, dated Jun. 19, 2018.
Notification of Examination Opinions issued in TW Patent App. 105141126 dated Apr. 7, 2020, English translation.
Notification of Reasons for Refusal issued in JP Patent Application No. 2016-574473 dated May 27, 2020, English translation.
Office Action issued in CN Patent Appl. No. 201680072640.0 dated Apr. 30, 2020, English translation.
EP Office Action issued in EP Patent Application No. 16875427.6 dated Mar. 18, 2021.

* cited by examiner

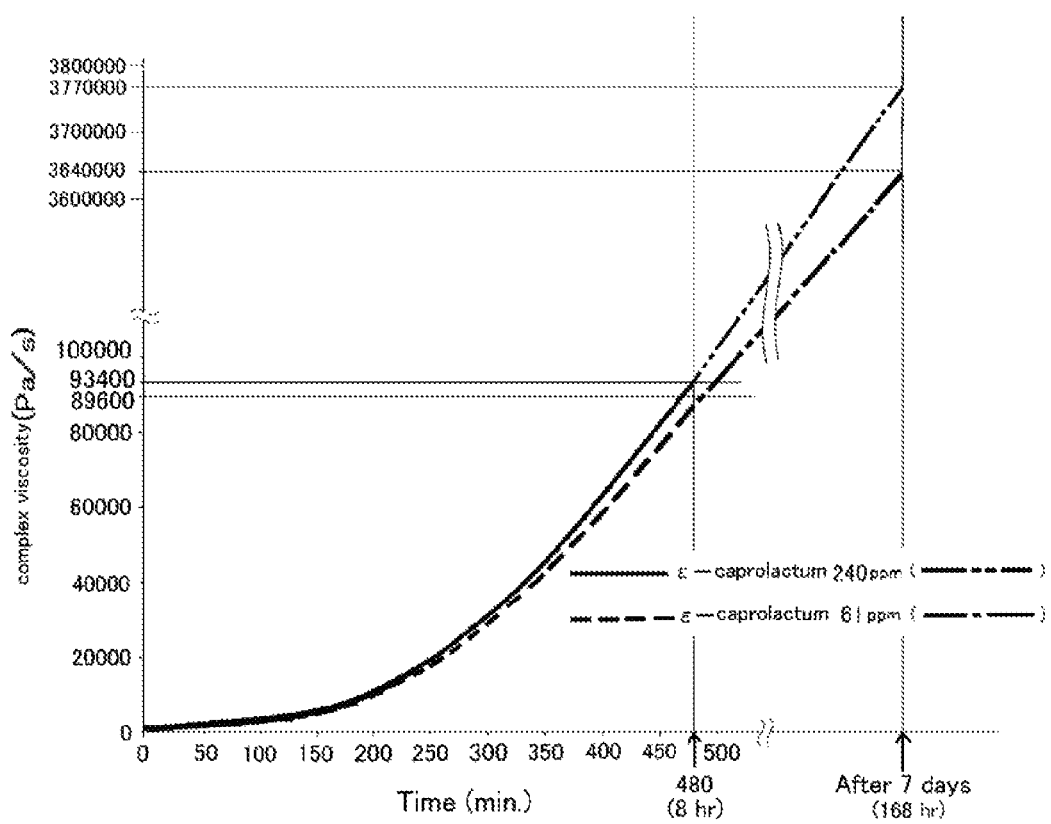

RESIN COMPOSITION AND METHOD FOR PRODUCING SAME

CLAIM FOR PRIORITY

This application is a Continuation of PCT/JP2016/085897 filed Dec. 2, 2016, and claims the priority benefit of Japanese application 2015-246080 filed Dec. 17, 2015, the contents of which are expressly incorporated by reference herein in their entireties.

This application is based on Japanese Patent Application No. 2015-246080 filed on Dec. 17, 2015 in Japan, and International Application No. PCT/JP2016/085897 filed on Dec. 2, 2016 in Japan, the contents of which hereby are incorporated by reference.

TECHNICAL FIELD

The present invention relates to a resin composition comprising a saponified ethylene-vinyl ester-based copolymer (hereinafter, sometimes called as "EVOH-based resin") and nylon 6-based polyamide such as nylon 6, and a method for producing the resin composition. In particular, the invention relates to a resin composition improved in long-run moldability and a method for producing the resin composition, and also relates to a method for improving long-run moldability of the resin composition.

BACKGROUND ART

EVOH-based resin is excellent in transparency, gas-barrier performance, odor retention, solvent resistance, oil resistance and so on, and therefore EVOH-based resin is utilized for a film or sheet as a packaging material for food, pharmaceutical, industrial medicine, or agrochemicals, and a container such as bottle and cup as a molded article.

Since EVOH-based resin film has a superior gas-barrier performance, the film is suitable for a retort. On the other hand, in the case that the film is subjected to retorting and a like treatment with water for long hours, the gas barrier performance is lowered, the film blushes and cannot sustain its original shape, which is a shortcoming of EVOH-based resin film.

As a resin composition which can provide a packaging film sustainable its original shape even after a treatment with hot water, there is a resin composition comprising polyamide-based resin in addition to EVOH-based resin as disclosed in, for example, a patent document 1. An example in the patent document 1 employs nylon 6 as a polyamide-based resin.

In a resin composition comprising EVOH-based resin and polyamide-based resin, a network structure is sometimes formed by the interaction between an amide bond contained in the polyamide-based resin and OH group and/or ester group contained in EVOH-based resin. The matter having a crosslinked structure resides in a melt-kneading apparatus and becomes gel-like substance which causes inferior appearance in a resulting film. Also the gel-like substance causes to increase melt viscosity in a continuous melt-molding operation, which lowers long-run moldability.

The patent document 1 discloses that the addition of a specific inorganic salt suppresses impairment of the gas barrier performance and stabilizes the viscosity behavior. In the patent document 1, the viscosity behavior is analyzed by measuring torque variation by use of a plasticorder. The less torque variation with time is judged as more excellent long-run moldability. That the ratio (T1/T2) of T1 to T2 is closer to 1 indicates less torque variation with time wherein T1 and T2 are torque values measured at 15 seconds and 1 hour respectively after starting the kneading operation.

Patent Document 1: JP2009-191255A

DISCLOSURE OF THE INVENTION

Technical Problem to be Solved the Invention

Nowadays, a severe criterion has been employed for an evaluation about appearance of packaging material. In this connection a severe criterion is also employed for an evaluation about long-run moldability. In the patent document 1, the evaluation about the long-run moldability is assessed based on the torque variation. This assessment proved that there is a case that long-run moldability is bad regardless of stable viscosity behavior according to the evaluation in the patent document 1. The case is occurred when gel is generated during a continuous melt-molding operation for long time.

For this reason, a resin composition comprising EVOH-based resin and nylon 6 needs the improvement of long-run moldability.

Under these situations, the present invention was made. The purpose of the invention is to establish an accurate evaluation method of long-run moldability, to improve the long-run moldability of a resin composition comprising an EVOH-based resin and a nylon 6-based polyamide based on the evaluation method, and to provide an improved resin composition.

Means for Solving the Problem

The inventors focused on a variation of complex viscosity with time which is measured by a rotational rheometer as an accurate method for assessing long-run moldability of a resin composition.

The measurement with use of torque rheometer analyzes viscosity behavior of a resin composition when applying shear with twin-screw, which differs from its viscosity behavior in melt-molding with single-screw extruder. This is supposed that the actual long-run moldability might not depend on stability of viscosity behavior measured based on torque variation. In particular, in a continuous melt molding operation of a resin composition comprising an EVOH-based resin and a polyamide-based resin, network structure may grow to result in gelation and therefore the viscosity behavior may become more complex.

With regard to these phenomena, the inventor has assumed that a rotational rheometer can apply shear to polymer like an extruder adopting a single screw and therefore the measurement with the rotational rheometer is appropriate for evaluation of long-run moldability.

Under the assumption we studied about the long-run moldability of various resin compositions comprising EVOH-based resin and nylon 6, and have found that an amount of ε-caprolactam affects the long-run moldability.

Since nylon 6 is commonly synthesized by ring-opening polymerization of ε-caprolactam in the presence of water, the ε-caprolactam contained in the resin composition seems to be a residual monomer of nylon 6.

Since a resin composition is melt-kneaded or melt-molded and these operations are usually carried out at a temperature 100° C. or higher, no water is usually remained in a kneading machine or melt-molding apparatus. Accordingly even when a ε-caprolactam is contained in a resin composition, the ε-caprolactam would not initiate a ring-opening polymerization. From these reasons, it has been supposed that a residual ε-caprolactam monomer would not affect long-run moldability of a resin composition comprising EVOH-based resin and nylon 6.

Surprisingly from the analysis by the inventor, it has been revealed that the amount of ε-caprolactam contained in the resin composition affects the long-run moldability of the resin composition. Based on this analysis result, the improvement of the long-run moldability of the resin composition comprising EVOH-based resin and nylon 6 has been achieved by reducing an amount of the ε-caprolactam contained in the resin composition.

A resin composition of the invention comprises a saponified ethylene-vinyl ester-based copolymer and nylon 6-based polyamide wherein ε-caprolactam is contained at a concentration of 200 ppm or less, preferably 100 ppm or less. The nylon 6-based polyamide is preferably nylon 6.

The ratio of the amounts in weight of the saponified ethylene-vinyl ester-based copolymer to the nylon 6-based polyamide, i.e. saponified ethylene-vinyl ester-based copolymer:nylon 6-based polyamide, is preferably from 50:50 to 99:1.

According to the invention, a method for producing resin composition is a method for producing a resin composition comprising a saponified ethylene-vinyl ester-based copolymer and nylon 6-based polyamide. The method comprises a process of contacting the nylon 6-based polyamide with water.

The contact process is carried out at any one step of i)-iv) shown below:
i) prior to mixing the saponified ethylene-vinyl ester-based copolymer with the nylon 6-based polyamide;
ii) when mixing the saponified ethylene-vinyl ester-based copolymer with the nylon 6-based polyamide;
iii) after mixing the saponified ethylene-vinyl ester-based copolymer with the nylon 6-based polyamide; or
iv) a combination of two or more of the i) to iii).

By the contact process, the amount of ε-caprolactam contained in the resin composition is preferably reduced to 200 ppm or less.

In another aspect of the invention, the invention involves a method of improving long-run moldability of a pellet of a resin composition comprising a saponified ethylene-vinyl ester-based copolymer, a nylon 6-based polyamide. The method comprises contacting the nylon 6-based polyamide with water, thereby reducing a concentration of ε-caprolactam to 200 ppm or less.

EFFECT OF THE INVENTION

The resin composition of the invention has a superior long-run moldability because the amount of ε-caprolactam as a residual monomer of nylon 6-based polyamide is reduced in the resin composition. The method of the invention may produce efficiently an inventive resin composition exhibiting a superior long-run moldability.

According to the inventive method of improving the long-run moldability may be carried out through washing a resin composition or nylon 6-based polyamide to be contained in the resin composition, which is very convenient.

BRIEF DESCRIPTION OF THE DRAWING

FIG. 1

FIG. 1 is a graph showing variation of complex viscosities of resin composition Nos. 1 and 2 with time.

MODE FOR CARRYING OUT OF THE INVENTION

Hereinafter, the present invention will be described, however the description shows merely one preferable embodiment and does not restrict the content of the invention.

<Resin Composition>

An inventive resin composition comprising a saponified ethylene-vinyl ester-based copolymer and nylon 6-based polyamide is characterized by that the amount of ε-caprolactam contained in the resin composition is 200 ppm or less.

[EVOH-Based Resin]

EVOH-based resin used in the disclosure is a water-insoluble thermoplastic resin and usually produced by saponifying a copolymer of ethylene and vinyl ester-based monomer, so-called ethylene-vinyl ester-based copolymer. The EVOH-based resin contains ethylene-derived structural unit and vinyl alcohol structural unit both as main structural units, and a slight amount of vinyl ester structural unit which exists as an unsaponified unit.

Vinyl acetate is employed as a typical vinyl ester-based monomer from the viewpoint of commercial availability and efficiency of removing impurities generated in production. Employed may be other vinyl ester-based monomer, for example, aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, as well as aromatic vinyl esters such as vinyl benzoate. Commonly used is an aliphatic vinyl ester having from usually 3 to 20 carbon atoms, preferably 4 to 10 carbon atoms, particularly preferably 4 to 7 carbon atoms. These vinyl ester-based monomers may be used individually or in a combination thereof according to needs.

Copolymerization of ethylene and vinyl ester-based monomer may be conducted by a known polymerization method including solution polymerization, suspension polymerization, and emulsion polymerization.

The solvents employed for the copolymerization are a lower alcohol such as methanol, ethanol, propanol, and butanol; a ketone such as methyl ethyl ketone, and so on. Methanol is preferably employed in industry.

Saponification of the produced ethylene-vinyl ester-based copolymer may be conducted by a known method.

Examples of catalysts used for saponification include alkali catalysts such as sodium hydroxide, potassium hydroxide, and a like alkali metal hydroxide, or sodium methylate, sodium ethylate, potassium methylate, lithium methylate, and a like alcoholate of alkali metal; acid catalysts such as sulfuric acid, chloric acid, nitric acid, and methanesulfonic acid; zeolite and cationic exchange resin.

The content of ethylene unit in the EVOH-based resin is in the range of usually 20 to 60 mol %, preferably 25 to 50 mol %, particularly preferably 25 to 35 mol %, as a measurement value in accordance with ISO14663. If the content of ethylene unit is unduly low, the gas-barrier performance under a high humidity condition and melt-molding property tends to be lowered. If the content of ethylene unit is unduly high, insufficient gas-barrier performance might be impaired.

The saponification degree of the vinyl ester unit in the EVOH-based resin is in the range of usually 90 to 100 mol %, preferably 95 to 100 mol %, particularly preferably 99 to 99.9 mol %, as a measurement value in accordance with JIS K6726 with the proviso that EVOH-based resin is dissolved homogenously in a mixed solvent of water and methanol. If the saponification degree is unduly low, the gas-barrier performance, thermostability, and humidity resistance tend to be lowered.

Melt flow rate (MFR) of the EVOH-based resin at 210° C. under a load of 2,160 g is usually 0.1 to 100 g/10 minutes, furthermore 0.5 to 50 g/10 minutes, particularly 1 to 30 g/10 minutes. EVOH-based resin having unduly low MFR tends to increase torque of extruder during molding, resulting in trouble in extrusion and processing operation. EVOH-based resin having unduly high MFR tends to be lowered in appearance and gas-barrier performance of its molded product.

In addition to ethylene-derived structural unit, vinyl alcohol structural unit, and optionally unsaponified vinyl ester structural unit, the EVOH-based resin used in the disclosure may further contain a structural unit derived from the following comonomer in an amount within the range not inhibiting the effect of the invention, for example, 10 mol % or less.

Examples of the comonomer include olefins such as propylene, 1-butene and isobutene; unsaturated acids such as acrylic acid, methacrylic acid, crotonic acid, phthalic acid (or anhydride), maleic acid (or anhydride), and itaconic acid (or anhydride) or salt thereof, or mono- or di-alkyl ester having from 1 to 18 carbon atoms in the alkyl group; acrylamides such as acrylamide, N-alkylacrylamide having from 1 to 18 carbon atoms in the alkyl group, N,N-dimethylacrylamide, 2-acrylamide propanesulfonic acid or salt thereof, and acrylamide propyl dimethylamine or salt thereof or quaternary salt thereof; methacrylamides such as methacrylamide, N-alkylmethacrylamide having from 1 to 18 carbon atoms in the alkyl group, N,N-dimethylmethacrylamide, 2-methacrylamide propanesulfonic acid or salt thereof, and methacrylamide propyl dimethylamine or salt thereof or quaternary salt thereof; N-vinylamides such as N-vinylpyrrolidone, N-vinylformamide, and N-vinylacetamide; vinyl cyanides such as acrylonitrile and methacrylonitrile; vinyl ethers such as alkyl vinyl ether, hydroxyalkyl vinyl ether, and alkoxyalkylvinyl ether having from 1 to 18 carbon atoms in respective alkyl group; vinyl halides such as vinyl chloride, vinylidene chloride, vinyl fluoride, vinylidene fluoride, and vinyl bromide; vinylsilanes, allyl acetate, allyl chloride, allyl alcohol, and dimethyl allyl alcohol, trimethyl-(3-acrylamide-3-dimethylpropyl)-ammonium chloride, acrylamide-2-methylpropanesulfonic acid, vinyl ethylene carbonate, ethylene carbonate, and the like.

Also, N-acrylic amide methyl trimethyl ammonium chloride, N-acrylic amide ethyl trimethyl ammonium chloride, N-acrylic amide propyl trimethyl ammonium chloride, 2-acryloxyethyl trimethyl ammonium chloride, 2-methacryloxyethyl trimethyl ammonium chloride, 2-hydroxy-3-methacryloyloxypropyl trimethyl ammonium chloride, allyltrimethyl ammonium chloride, methallyltrimethyl ammonium chloride, 3-butene trimethyl ammonium chloride, dimethyl diallyl ammonium chloride, diethyl diallyl ammonium chloride, and a like cationic group-containing monomer or a like acetoacetyl group-containing monomer may be employed.

The vinylsilanes include vinyltrimethoxysilane, vinylmethyldimethoxysilane, vinyldimethylmethoxysilane, vinyltriethoxysilane, vinylmethyldiethoxysilane, vinyldimethylethoxysilane, vinylisobutyldimethoxysilane, vinylethyldimethoxysilane, vinylmethoxy dibutoxysilane, vinyldimethoxy butoxysilane, vinyltributoxysilane, vinylmethoxy dihexyloxysilane, vinyldimethoxy hexyloxysilane, vinyltrihexyloxysilane, vinylmethoxy dioctyloxysilane, vinyldimethoxy octyloxysilane, vinyltrioctyloxysilane, vinylmethoxy dilauryloxysilane, vinyldimethoxy lauryloxysilane, vinylmethoxy dioleyloxysilane, and vinyldimethoxy oleyloxysilane.

In addition, a post-modified EVOH-based resin by urethanation, acetalization, cyanoethylation, or oxyalkylenation may be used.

Among the modified EVOH resins, an EVOH-based resin obtained by introducing a primary hydroxyl group by copolymerization is preferred from the viewpoint of formability in secondary forming such as stretching operation, vacuum forming or air-pressure forming. In particular, EVOH-based resin having 1,2-diol in a side chain thereof as shown in the structural unit (1) below is preferred.

[Formula 1]

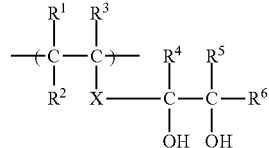

(1)

In the formula (1), $R^1$, $R^2$, and $R^3$ represent hydrogen atom or an organic group independently, and X represents single bond or a binding chain, and $R^4$, $R^5$, and $R^6$ represent hydrogen atom or an organic group independently.

Non-limiting examples of the organic group in the 1,2-diol structural unit of the formula (1) include saturated hydrocarbon group such as methyl, ethyl, n-propyl, isopropyl, n-butyl, isobutyl, and tert-butyl; aromatic hydrocarbon group such as phenyl and benzyl group; halogen, hydroxyl, acyloxy, alkoxycarbonyl, carboxyl, sulfonic acid group, and so on.

$R^1$ to $R^6$ each is a saturated hydrocarbon group having from usually 1 to 30 carbon atoms, preferably 1 to 15 carbon atoms, more preferably 1 to 4 carbon atoms, or hydrogen atom. Of these, hydrogen atom is most preferred. In particular, it is most preferred that all of $R^1$ to $R^6$ are hydrogens.

X in the structural unit of the formula (1) is typically single bond, and may also be a binding chain. Non-limiting examples of the binding chain include hydrocarbon chain such as alkylene, alkenylene, alkynylene, phenylene, and naphthylene (wherein at least one hydrogen atom of these hydrocarbons may be substituted with halogen such as fluorine, chlorine, or bromine), as well as ether bond-containing group such as —O—, —(CH$_2$O)m-, —(OCH$_2$)m-, and —(CH$_2$O)mCH$_2$—; carbonyl group-containing chain such as —CO—, —COCO—, —CO(CH$_2$)mCO—, and —CO(C$_6$H$_4$)CO—; sulfur atom-containing group such as —S—, —CS—, —SO—, and —SO$_2$—; nitrogen atom-containing group such as —NR—, —CONR—, —NRCO—, —CSNR—, —NRCS—, and —NRNR—; hetero such as phosphorus atom-containing group such as —HPO$_4$—; silicon atom-containing group such as —Si(OR)$_2$—, —OSi(OR)$_2$—, and —OSi(OR)$_2$O—; titanium atom-containing group such as —Ti(OR)$_2$—, —OTi (OR)$_2$—, and —OTi(OR)$_2$O—; aluminum-containing group such as —Al(OR)—, —OAl(OR)—, and —OAl(OR)O—, wherein R is independently a substituting group, and preferably hydrogen atom or an alkyl group, m is a natural number selected from usually 1 to 30, preferably 1 to 15, particularly preferably 1 to 10; and a like metal-containing group. Among them, —CH$_2$OCH$_2$—, and hydrocarbon chain having from 1 to 10 carbon atoms, moreover 1 to 6 carbon atoms, especially one carbon atom, are preferred from the viewpoint of stability in production and usage.

In the case of containing 1,2-diol structural unit of the formula (1), the content of the structural unit is in the range of usually 0.1 to 20 mol %, preferably 0.1 to 15 mol %, particularly 0.1 to 10 mol %.

The most preferable structure of 1,2-diol structural unit represented by the formula (1) is a structure where all $R^1$ to $R^6$ are hydrogen atoms and X is single bond, that is, the structural unit of the formula (1a) below.

[Formula 1a]

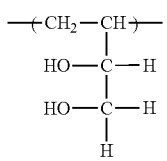

(1a)

In EVOH-based resin containing 1,2-diol structural unit represented by the formula (1) or (1a), the following monomer or its saponified product, which are derived from the monomer used in the production of the EVOH-based resin, may be remained. The monomer or its saponified product includes 3,4-diol-1-butene, 3,4-diacyloxy-1-butene, 3-acyloxy-4-ol-1-butene, 4-acyloxy-3-ol-1-butene, 4,5-diol-1-pentene, 4,5-diacyloxy-1-pentene, 4,5-diol-3-methyl-1-pentene, 4,5-diol-3-methyl-1-pentene, 5,6-diol-1-hexene, 5,6-diacyloxy-1-hexene, 4,5-diacyloxy-2-methyl-1-butene.

[Nylon 6-Based Polyamide]

Nylon 6-based polyamide to be used in the disclosure is a polyamide containing a unit derived from ε-caprolactam as a structural unit of the polymer molecule. The nylon 6-based polyamide is not limited to ε-caprolactam homopolymer. The nylon 6-based polyamide includes a copolymer of ε-caprolactam and other lactam, and copolymerized nylon 6 which is a copolymer of ε-caprolactam and other diamine and dicarboxylic acid. Among them, ε-caprolactam homopolymer is preferred from the viewpoint of resistance to retorting treatment as a hot water treatment.

A typical ε-caprolactam homopolymer is nylon 6.

Nylon 6 or ε-caprolactam homopolymer may be synthesized by ring-opening polymerization or anion polymerization of ε-caprolactam.

Examples of copolymerized nylon 6 include polyamide copolymer of ε-caprolactam, hexamethylene diamine and adipic acid (6/66 nylon), condensation polymer of ε-caprolactam and ω-laurolactam (6/12 nylon), polyamide copolymer of ε-caprolactam, combination of hexamethylene diamine and adipic acid, and ω-laurolactam (6/66/12 nylon).

The method of polymerization for synthesizing polyamide is not limited, and any known method such as thermal melting polycondensation, ring-opening polymerization of lactam, and solution polymerization. A monobasic acid such as acetic acid and benzoic acid, monoacidic base such as hexylamine and aniline may be added as a molecular weight adjuster. If necessary, sodium phosphite, sodium hypophosphite, phosphorous acid, hypophosphorous acid, and thermal stabilizer such as hindered phenol, and other polymerization additive may be added.

The terminal of the above-mentioned nylon 6-based polyamide may be blocked with carboxylic acid or amine. Carboxylic acid or amine having from 6-22 carbon atoms respectively may be preferably used for blocking. Examples of the carboxylic acid used for blocking include aliphatic monocarboxylic acid such as caproic acid, caprylic acid, capric acid, lauric acid, myristic acid, palmitic acid, stearic acid, and behenic acid. Examples of the amine for blocking include aliphatic primary amine such as hexylamine, octylamine, decylamine, laurylamine, myristilamine, palmitilamine, stearilamine, and behenilamine, aliphaticdiamine such as hexamethylenediamine, aromaticdiamine such as meta-xylenediamine.

Nylon 6-based polyamide preferably have a relative viscosity of 2.0 to 6.5, but not limited thereto. The relative viscosity is measured according to JIS K6810 (concentration: 1% in 98% sulfuric acid at 25° C.). Unduly low relative viscosity tends to impair the strength of the molded product. Unduly high relative viscosity tends to lower the strength of fused area formed by injection process. A more preferable relative viscosity of nylon 6-based polyamide ranges from 2.2 to 3.5.

A plurality of nylon 6-based polyamides differing in relative viscosity may be combined.

The above-mentioned nylon 6-based polyamide usually contains ε-caprolactam as a residual monomer and the amount of the ε-caprolactam depends on grade of nylon 6-based polyamide. A commercially available nylon 6-based polyamide commonly contains 5000 ppm or more of ε-caprolactam as a residual monomer. However, an amount of the ε-caprolactam as the residual monomer contained in a resin composition becomes lower by the treatment for reducing ε-caprolactam described later, as compared to an amount of ε-caprolactam contained in a conventional nylon 6-based polyamide used for film or the like.

The content of nylon 6-based polyamide in the resin composition may be selected in accordance with a desired physical property. The ratio in weight of EVOH-based resin to nylon 6-based polyamide is usually from 50:50 to 99:1, preferably 60:40 to 97:3, more preferably 70:30 to 95:5, and particularly preferably 70:30 to 90:10.

If the content percentage of nylon 6-based polyamide is unduly high, gas-barrier performance is impaired because of relatively reduced content of EVOH-based resin. If the content percentage of nylon 6-based polyamide is unduly low, suppression of elution after hot water treatment tends to be insufficient. If the content of nylon 6-based polyamide is increased, the long-run moldability tends to be lowered. However the inventive resin composition can meet the requirement of long-run moldability even when the percentage in weight of nylon 6-based polyamide relative to EVOH-based resin is increased because of the reduced amount of ε-caprolactam which causes impairment of long-run moldability.

[ε-Caprolactam]

A resin composition of the invention may contain ε-caprolactam as a residual monomer derived from nylon 6-based polyamide, but the amount is reduced to 200 ppm or less, preferably 150 ppm or less, more preferably 100 ppm or less. The lower the amount is the more preferred, however the lower limit is usually around 10 ppm from the efficiency of production.

In the resin composition containing EVOH-based resin and nylon 6-based polyamide, unduly high amount of ε-caprolactam impairs long-run moldability. The mechanism of the impairment is presumed as follows.

Rich hydroxyl groups in EVOH-based resin tend to hold water molecule in the EVOH-based resin as compared to other typical thermoplastic resin such as polyolefin or polystyrene. In the case of preparing pellets of the resin composition containing EVOH-based resin and polyamide, the resulting pellet has usually 0.1 to 0.2 wt % of moisture although the moisture contained in the raw material resin is supposed to evaporate during pelletization process where the resin composition is heated to 100° C. or more and molten.

When the resin composition containing EVOH-based resin and nylon 6-based polyamide is melt-kneaded and melt-molded, shear force is applied to the resin composition under high temperature. Such condition may trigger hydrolysis of ε-caprolactam present in the resin composition by moisture derived from the above-mentioned raw material resin or existing in the resin composition, the resultant carboxyl group (—COOH) and amino group (—NH$_2$) react with hydroxyl group (—OH) in EVOH-based resin during being melt-kneaded. As a result, a crosslinked structure is formed and the viscosity increases. In particular, in the case that pellet of the resin composition absorbs moisture while being left under high humidity condition or in air for a long time after the production of the pellet, the viscosity may readily increase due to the ε-caprolactam.

However the resin composition of the invention can avoid the viscosity increase because the amount of ε-caprolactam is reduced. Accordingly the effect of the invention tends to be obtained in the case that the resin composition contains a bit of water.

[Other Thermoplastic Resin]

Aside from EVOH-based resin and nylon 6-based polyamide, the resin composition may usually contain a thermoplastic resin within the range not inhibiting the effect of the invention, for example, an amount of 30 wt % or less.

Examples of the thermoplastic resin include polyamide-based resin other than nylon 6-based polyamide; polyolefins such as polyethylenes including linear low density polyethylene, low density polyethylene, very low density polyethylene, medium density polyethylene, and high density polyethylene, polypropylene, ethylene-propylene (block- or random-)copolymer, propylene-α-olefin (having from 4 to 20 carbon atoms) copolymer, polybutene, and polypentene; graft modified polyolefins obtainable by graft modification of the said polyolefins with an unsaturated carboxylic acid or ester; ionomer; ethylene-vinyl acetate copolymer; ethylene-acrylic acid copolymer; ethylene-acrylate copolymer; polyester-based resin; polyvinyl chloride and polyvinylidene chloride; acryl-based resin; polystyrene; vinyl ester-based resin; polyester elastomer; polyurethane elastomer; halogenated polyolefin such as chlorinated polyethylene and chlorinated polypropylene; and aromatic or aliphatic polyketone. Polyalcohols obtainable by reducing the above-mentioned polymer are also included.

[Other Additives]

Aside from the above identified ingredients, the resin composition in the disclosure may optionally contain a known additive within the range of the amount not inhibiting the effect, for example, 5 wt % or less.

Examples of the additive include saturated aliphatic amide (e.g. stearamide), unsaturated fatty acid amide (e.g. amide oleate), bis-fatty acid amide (e.g. ethylene bis stearamide); metal salt of fatty acid (e.g. calcium stearate and magnesium stearate), lubricant such as low molecular weight polyolefin (e.g. low molecular weight polyethylene or low molecular weight polypropylene having a molecular weight of 500 to 10000); inorganic salt (e.g. hydrotalcite); plasticizer (e.g. aliphatic polyalcohol such as ethylene glycol, glycerin, and hexanediol); oxygen absorbent; photooxidation collapse-related resin (e.g. polyketone); combination of anthraquinone polymer (e.g. polyvinyl anthraquinone) or these compositions, and photoinitiator (e.g. benzophenone), peroxide supplement agent (e.g. commercial antioxidants), or deodorant (e.g. active carbons); heat stabilizer; light stabilizer; antioxidant; ultraviolet rays absorbent; coloring agent; antistatic agent; surfactant; antibiotics; anti-blocking agents; slip agent; and fillers (e.g. inorganic fillers). The oxygen absorbent include inorganic oxygen absorbent such as a combination of reduction iron powder and a water absorptive material or electrolyte, aluminum powder, potassium sulfite, and titanium oxide photocatalyst; organic oxygen absorbent such as ascorbic acid or ester or metal salt thereof, hydroquinone, gallic acid, polyvalence phenols such as the hydroxyl group-containing phenol-aldehyde resin, coordination compound in which a transition metal is coordinate bonded with nitrogen-containing compound such as bis-salicylaldehyde-imine cobalt, tetraethylenepentamine cobalt, cobalt-Schiff base complex, porphyrin, macrocyclic polyamine complex, or polyethyleneimine-cobalt complexes, product of reaction between terpene compound or amino acid and hydroxyl group-containing reducing material, and triphenylmethyl compound; polymer type oxygen absorber such as coordination compound in which a transition metal is coordinate bonded with nitrogen-containing resin (e.g. combination of MXD nylon and cobalt), blend of transition metal and tertiary hydrogen-containing resin (e.g. combination of polypropylene and cobalt), and blend of carbon-carbon unsaturated bond-containing resin and transition metal (e.g. combination of polybutadiene and cobalt).

The resin composition may contain an acid such as acetic acid and phosphoric acid, or its salt of alkali metal, alkaline earth metal or transition metal, and boron compound such as boric acid or its metal salt within the range of amount not inhibiting the effect of the invention. These may improve thermostability of the resin.

[Preparation of Resin Composition]

The resin composition of the invention may be prepared by mixing the above-mentioned ingredients. Mixing may be carried out by melt-mixing, solution mixing or the like. Of these, melt-mixing is preferred from the viewpoint of productivity.

In the case of melt-mixing, an order of mixing of EVOH-based resin and nylon 6-based polyamide is not limited.

The melt mixing may be carried out by a method, for example, melt-kneading EVOH-based resin and nylon 6-based polyamide at the same time; melting EVOH-based resin (or nylon 6-based polyamide) in advance, and adding nylon 6-based polyamide (or EVOH-based resin), followed by melt-kneading them; preparing concentrated composition (generally called "masterbatch") obtained by blending excess amount of nylon 6-based polyamide to EVOH-based resin, and adding EVOH-based resin or nylon 6-based polyamide to the concentrated composition at an amount for targeted mixing ratio, followed by diluting the resultant.

Apparatus for melt-kneading is not limited, and a known apparatus for melt-kneading such as kneader-ruder, mixing roll, Bunbury mixer, plastomill, and extruder may be used. Either uniaxial or biaxial extruder may be used for the extruder. The extruder may be equipped with vent suction device, gear pump, screen, and the like. The melt-kneading may be usually conducted at a temperature of 150 to 300° C., preferably 220 to 280° C. depending on a composition.

Water, alcohol, or water/alcohol mixed solution may be employed for the solvent in solution mixing operation. As the alcohol, -alcohol having from 1 to 8 carbon atoms, such as methanol, ethanol, 1-propanol, 2-propanol, 1-butanol, 2-methyl-1-propanol, 2-butanol, or 2-methyl-2-propanol is preferably used, more preferably alcohol having from 1 to 5, further more preferably having from 1 to 3 carbon atoms is used. Of these, methanol is particularly preferably used because of commercial availability and reasonable cost.

A resin composition thus prepared is usually provided in a form of pellet.

The pellet is produced by a conventionally known method, which includes hot-cut pelletizing process and strand-cut pelletizing process. The hot-cut pelletizing process is conducted by extruding molten EVOH-based resin from the outlet and cutting the extrudate, followed by cooling and being solidified. The strand cut pelletizing process is conducted by extruding solution or slurry of resin composition into a coagulating bath to obtain a resin strand and cutting the strand.

The hot-cut pelletizing process is classified into hot-cut pelletizing and underwater cut pelletizing, and either may be employed. In the former cutting is conducted in air, and in the latter the molten resin is extruded into a bath filled with cooling liquid and equipped with cutter and cutting is conducted underwater.

In the case of preparing a resin composition by melt-kneading, the air hot cut pelletization is preferably employed.

The temperature of the cooling liquid used in the underwater pelletizing operation is such a temperature that the extrudate of EVOH-based resin melt does not solidify instantly in the coagulating bath. In the case of allowing the EVOH-based resin to contact cooling liquid before cutting, the cooling liquid is preferably set at a temperature within the range of −20 to 50° C., more preferably −5 to 30° C.

Liquid for cooling is not limited to water. May be also used the liquid such as a mixture of water and alcohol; aromatic hydrocarbons such as benzene; ketones such as acetone and methyl ethyl ketone; ethers such as dipropyl ether; organic esters such as methyl acetate, ethyl acetate, methyl propionate and so on. Of these, water or a mixture of water and alcohol may be used because of handleability. As for the mixture of water and alcohol, a weight ratio of water to alcohol is usually from 90/10 to 99/1. As for the alcohol, lower alcohol such as methanol, ethanol, and propanol, specifically alcohol having from 1 to 3 carbon atoms may be used, and methanol is preferably used in industry.

The shape of the pellet may depend on the production process thereof. Any shape such as column, sphere, disc, cube, cuboid, and indefinite shape may be employed.

Size and shape of the pellet may be controlled by adjusting bore of nozzle of the extruder used for the production, number and rotation speed of blades of cutter used for pelletizing operation.

When it comes to the size of pellet, a typical cylindrical pellet is from 1 to 10 mm, preferably 1.5 to 4 mm in diameter of the bottom surface and 1 to 10 mm, preferably 1.5 to 3 mm in length, and a typical spherical pellet is from 1 to 10 mm, preferably 2 to 7 mm in diameter.

[Adjustment of the Amount of ε-Caprolactam]

The amount of ε-caprolactam contained in the resin composition of the invention is 200 ppm or less, preferably 150 ppm or less, more preferably 100 ppm or less.

A commonly available nylon 6-based polyamide contains ε-caprolactam of 5000 ppm or more as a residual monomer depending on the grade of the polyamide. Accordingly in order to adjust the amount of ε-caprolactam in the resin composition to 200 ppm or less, a treatment for reducing the amount of ε-caprolactam is necessary.

The reduction of the amount of ε-caprolactam is accomplished preferably by contacting with water (contact process) but not limited thereto. The contact process is preferred because ε-caprolactam may be removed efficiently due to high solubility of ε-caprolactam in water. Moreover drying conducted after washing which is a treatment for reducing the amount of ε-caprolactam rarely affects the resin composition.

The process for reducing the amount of ε-caprolactam may be carried out at the stage of either preparing the resin composition or preparing a pellet of the resin composition. That is to say, the contact process may be carried out at any one selected from the stages i)-iv) described below.

i) prior to mixing saponified ethylene-vinyl ester-based copolymer with nylon 6-based polyamide;
ii) at the time of mixing saponified ethylene-vinyl ester-based copolymer with nylon 6-based polyamide;
iii) after mixing saponified ethylene-vinyl ester-based copolymer with nylon 6-based polyamide; and
iv) a combination of two or more processes selected from the above.

Specifically the treatment with water may be preferably conducted by the following: contacting nylon 6-based polyamide with water in advance, and then mixing EVOH resin with the polyamide; supplying a dry blend of EVOH resin and nylon 6-based resin to the treatment of contacting with water; supplying a resultant obtained by melt-kneading EVOH resin and nylon 6-based polyamide to the treatment of contacting with water; supplying a pellet of the resin composition to the treatment of contacting with water and then supplying the resulting pellet to a molding machine; and a combination of them.

The process of contacting with water is carried out by, for example, immersing in water under agitation, circulating resin composition (preferably in the form of pellets) in water, exposing resin composition to flowing water, or spraying to resin composition (preferably in the form of pellet) with washing liquid. In immersing operation, addition of vibrating with ultrasonic wave is effective for washing. In industry practice, immersing in a washing liquid under agitation and circulating pellets in a washing liquid are preferably employed.

A preferable contact time with water is from 5 minutes to 48 hours, particularly 10 minutes to 24 hours. A preferable temperature of the washing liquid is from 10 to 80° C., particularly 20 to 60° C. Unduly short contact time might not achieve to reduce the amount of ε-caprolactam sufficiently. Unduly long contact time tends to make the polyamide hydrolyzed. Unduly cold water might not achieve to reduce the amount of ε-caprolactam sufficiently. Unduly hot water tends to make the polyamide hydrolyzed.

With regard to a place where the washing treatment is carried out, tower type tank such as plate column (e.g. porous plate tower and bubble cap tower) and packed column, as well as a container such as beaker and flask may be employed. In the case of tower type container, the process of contacting resin composition with water may be carried out in either countercurrent flow or concurrent flow. The contact process in countercurrent flow is preferably employed from the viewpoint of efficiency of substitution. In the case of using a container such as beaker and flask, the contact between the resin composition and water is preferably performed under agitation with use of stirrer or agitating tool.

After the contact process, drying is preferably carried out. Specifically, drying is carried out until the water content is reduced to the extent of 0.01 to 1%, preferably 0.05 to 0.5%. Since the amount of ε-caprolactam contained in the resin composition is reduced, an increased amount of water does not bring out viscosity increase during melt-kneading or melt molding of the resin composition. Problematic impairment of long-run moldability is not accompanied either. However, unduly high content of water might cause foaming during the production of pellets or melt-molding. Accordingly the lower the content of water is the better.

Various drying methods may be employed for the drying process. Examples of the drying process include flow drying system in which pellets of resin composition are mechanically agitated or dispersed by hot wind and dried; and static drying system in which drying pellets is achieved only by being left without dynamic motion such as agitation or dispersion. Examples of the dryer for flow drying system include cylinder/channel type mixing dryer, cylindrical dryer, rotary dryer, fluidized bed dryer, vibration fluidized bed dryer, or cone rotary dryer. Examples of the dryer for static drying system include batch box type dryer where the matter is still standing, band dryer where the matter is transported, and tunnel dryer and vertical silo dryer. The flow drying system and static drying system may be combined and employed for the drying process.

The drying process utilizes a heated gas such as air or inert gas (e.g. nitrogen gas, helium gas, and argon gas). The preferable temperature of the heated gas is in the range of 40 to 150° C. from the viewpoint of productivity and prevention of thermal deterioration of EVOH-based resin. The preferable drying time is commonly from 15 minutes to 72 hours depending on the water content of EVOH-based resin and the amount to be treated from the viewpoint of productivity and prevention of thermal deterioration of EVOH-based resin.

The process for reducing the amount of ε-caprolactam, namely the contact process of nylon 6-based polyamide with water may not be limited to the application to nylon 6-based polyamide resin alone. The process may also be conducted after mixing with EVOH-based resin or in the state of pellets. The process of contacting with water is preferably carried out in a state of nylon 6-based polyamide and thereafter mixing it with EVOH-based resin because washing operation before mixing is beneficial in the efficiency of removal of ε-caprolactam. This is because sufficient removal of ε-caprolactam from nylon 6-based polyamide by washing before mixing can make washing process simpler after mixing with EVOH-based resin. This can suppress increase of the amount of water contained in a pellet as a final product of the resin composition.

On the other hand, in the case that contacting process is carried out in a state of a mixture of EVOH-based resin and nylon 6-based polyamide, impurities such as residual monomer remained in EVOH-based resin may also be reduced, which contributes to a high quality product.

The amount of ε-caprolactam as a residual monomer contained in thus produced resin composition is as low as 200 ppm or less regardless of nylon 6-based polyamide synthesized from ε-caprolactam monomer. Therefore although melt extrusion molding is continuous process, increase of melt viscosity, in particular, increase of complex viscosity with time is suppressed, resulting in excellent long-run moldability.

Even when pellets of the resin composition containing the EVOH-based resin is preserved and the EVOH-based resin absorbs moisture, the viscosity increase concerning the pellets is expected to be suppressed owing to the reduction of the amount of ε-caprolactam contained in the resin composition.

Specifically, when applying shear force with a rotational rheometer (frequency: 1 rad/s, deformation: 5%), change (or increase) of complex viscosity with time in measurement can be suppressed. The ratio of complex viscosities at 240° C. of η (8 hr) to η (5 min), i.e. η (8 hr)/η (5 min), may be lowered less than 73, wherein the η (8 hr) and η (5 min) are complex viscosities measured after 8 hours and 5 minutes of applying shearing force respectively. In another aspects, the ratio of complex viscosities at 240° C. of η (6 hr) to η (20 min), i.e. η (6 hr)/η (20 min), can be lowered less than 35, preferably less than 33, more preferably less than 30, wherein the η (6 hr) and η (20 min) are complex viscosities measured after 6 hours and 20 minutes of applying shear force respectively.

The complex viscosity of resin composition behaves like non-Newtorian fluid as shown in FIG. 1. The rate of increase in the viscosity is significantly high after 200 minutes.

Accordingly even if the difference in the above-mentioned ratios is about 1, the difference in viscosity is large after one week (i.e. 168 hours later). This is recognized as a difference in melt-molding property.

For this reason, the production of resin composition containing EVOH-based resin and nylon 6-based polyamide comprises a process of contacting nylon 6-based polyamide with water. According to the production, the amount of ε-caprolactam contained in the resin composition may be reduced to 200 ppm or less preferably 150 ppm or less, more preferably 100 ppm or less, resulting in improvement of long-run moldability.

The resin composition of the invention may be formed into pellet by the above-mentioned method.

When it comes to the size of pellet, a typical cylindrical pellet is from 1 to 10 mm, preferably 1.5 to 4 mm in diameter of the bottom surface, and 1 to 10 mm, preferably 1.5 to 3 mm in length, and a typical spherical pellet is from 1 to 10 mm, preferably 2 to 7 mm in diameter. The water content of the pellet is in the range of usually 0.01 to 1%, preferably 0.05 to 0.5%, particularly preferably 0.05 to 0.3%. Since the amount of ε-caprolactam contained in the resin composition is reduced, the increase of water content would not increase viscosity during melt kneading or melt molding of the resin composition, and would not always lead a significant impairment of long-run moldability. On the other hand, unduly high water content might foam during the production or melt-molding of pellets, therefor relatively low water content is preferred.

The water content may be determined by, for example, the method shown below.

An aluminum cup alone (weight: C1), and pellets (weight: P1) put in the aluminum cup (total weight: (C1+P1)) are weighed respectively. The aluminum cup in which the pellets are put is heated at 150° C. by being left in an oven ("SAFETY OVEN SPH-100"™ from ESPEC CORP.) under a non-vacuum condition replaced with nitrogen gas. After heating, the aluminum cup in which heated pellets (weight: P2) are put is taken out from the oven and its total weight (C1+P2) is weighed. The water content (wt %) is calculated by the equation.

$$\text{water content (wt \%)} = \frac{(C1+P1)-(C1+P2)}{(C1+P1)-C1} \times 100 = \frac{P1-P2}{P1} \times 100 \qquad \text{[Equation 1]}$$

<Use of Resin Composition>

Since the resin composition comprising EVOH-based resin and nylon 6-based polyamide exhibits excellent gas-barrier performance, the resin composition may be used as a packaging material for food, pharmaceutical, industrial medicine, and agrochemicals. Since the resin composition particularly exhibits superior resistance to retorting treatment, the resin composition is particularly suitable for use for film or sheet as a packaging material for food, or a molded article including bottle and container such as cup.

The resin composition of the invention is excellent in long-run moldability and therefore continuous melt-molding such as extrusion molding and injection molding may be properly employed. Even if melt molding operation continues for long time, a molding apparatus may run stably and produce a molded article with suppressing the occurrence of gel or a like substance. Accordingly the resin composition may be molded into an article having excellent appearance continuously and stably, which means superior productivity.

As the melt-molding operation, extrusion molding (e.g. T-die extrusion, blown film extrusion, blow molding, melt spinning, contour extrusion etc.), injection molding and the like may be employed. The melt-molding temperature is selected from the range of usually 150 to 300° C. depending on the resin composition.

A melt-molded article made from the resin composition may be directly used in a variety of applications. Also a layered structure in which a substrate is layered over the film for imparting another property or increasing the strength is preferably employed.

The resin composition of the invention may be formed into a layer included in a laminate containing at least one layer comprising the resin composition. A preferable laminate comprises a layer of a thermoplastic resin (e.g. polyolefin such as polyethylene-based resin, polyamide-based resin, and acryl-based resin) other than EVOH-based resin and the inventive resin composition and an adhesive resin layer interposed between the resin composition layer and the thermoplastic layer.

The resin composition layer is laminated over a substrate by a known method, such as a method of melt-extruding a substrate resin over a film or sheet of the resin composition to form a laminate; a method of melt-extruding the resin composition over a film or sheet of the substrate resin to form a laminate; a method of coextruding an inventive resin composition with a substrate resin to form a laminate; a method of dry bonding the inventive resin composition layer and substrate resin layer to form a laminate with use of a known adhesive such as organic titanium compound, isocyanate compound, polyester-based compound or polyurethane compound; a method of applying a solution of the inventive resin composition to a film or sheet and removing the solvent of the solution. Of these, a method of coextruding is preferred from the viewpoint of cost and environment.

Since the resin composition of the disclosure is excellent in long-run moldability, the method of coextruding with thermoplastic resin may be employed as an appropriate method. This may support to improve the productivity of an above-mentioned laminate.

EXAMPLE

The invention will be specifically explained with examples below, but these examples do not restrict the invention as long as it does not exceed the gist of the invention.

The term "parts" in Examples is on the basis of weight unless otherwise indicated.

[Measurement of the Amount of ε-Caprolactam]

An amount of ε-caprolactam was determined by dissolving pellets of a resin composition in hexafluoroisopropanol, subsequently precipitating with methanol, removing polymeric compounds and analyzing with high speed liquid chromatography.

For the high speed liquid chromatography analysis was carried out with an PU-2085 Plus type apparatus (from JASCO Corporation) having a column "Unison UK-C18 (4.6 mml ID×150 mm, 3 m)" (from Imtakt).

[Measurement of Complex Viscosity]

The complex viscosity (Pa·s) of resin composition pellet was measured with use of rotational rheometer "MCR301" (from Anton Paar company) in the manner that a shear force is applied to the pellet under the below condition and a predetermined hours later the complex viscosity was measured.

(Condition of Measurement)
Nitrogen atmosphere
Temperature: 240° C.,
Deformation: 5%,
Frequency: 1 rad/sec

[Constituent Ingredients of Resin Composition]

(1) EVOH-Based Resin

EVOH-based resin having ethylene unit content of 29 mol %, saponification degree of 99.7 mol %, and MFR 4 g/10 min. (210° C., load 2160 g) was used.

(2) Nylon 6-Based Polyamide

"Novamid™1028EN" (nylon 6) (from DSM company) was used.

[Relationship 1 Between Amount of ε-Caprolactam and Long-Run Moldability]

(1) Resin Composition No. 1:

The treatment for reducing the amount of ε-caprolactam was conducted by agitating nylon 6 underwater at 60° C. for 12 hours. Ten parts of nylon 6 after being subjected to the washing treatment with water was dry blended with 90 parts of EVOH-based resin. Thus obtained mixture was fed to a feeder and melt-kneaded to extrude in a form of strand by a twin-screw extruder having two mixing zones under the condition below, followed by being pelletized with a drum type pelletizer. Thus pellet of resin composition No. 1 was produced.

twin-screw extruder: 32 mm in diameter
set temperatures of extruder:

C2/C3/C4/C5/C6/C7/C8/C9/C10/C11/C12/C13/C14/
C15/C16/H/D=120/180/180/200/230/230/220/
220/220/220/220/220/220/220/220° C.

The amount of ε-caprolactam contained in the pellet of the resin composition No. 1 was 61 ppm according to the above-mentioned measurement.

The complex viscosity of the pellet of the resin composition No. 1 was measured according to the above-mentioned method every 5 minutes for 480 minutes. The complex viscosities varied with time over a 480-minute span were shown as a dotted line in FIG. 1. The complex viscosity after 7 days (168 hours later) was determined by extrapolating from the obtained viscosity curve. The extrapolation was shown as dot-and-dash line in FIG. 1. Rate of variation with time Δ1 and Δ2 were calculated by the formula below. The calculation results were indicated in Table 1.

Rates of variation with time Δ1 and Δ2 were calculated by the following equations wherein η (5 min), η (8 hr), and η (7 day) indicate complex viscosities after 5 minutes, 480 minutes (i.e. 8 hours) and 7 days respectively.

Rate of variation with time Δ1=η (8 hr)/η(5 min)

Rate of variation with time Δ2=η (7 day)/η(5 min)

The larger rate of variation with time means the inferior long-run moldability.

(2) Resin Composition No. 2

The pellets of resin composition No. 2 were produced in the same manner as that of No. 1 except that nylon 6 was not subjected to washing treatment. The amount of ε-caprolactam contained in the pellet was 240 ppm as a measurement value. The complex viscosity of this pellet was measured and the long-run moldability was evaluated. Variation of complex viscosity for 480 minutes was indicated as solid line in FIG. 1. The complex viscosity measured after 7 days (168 hours later) was determined by extrapolating from the obtained viscosity curve. The extrapolation was indicated as two-dot chain line in FIG. 1. Moreover rates of variation with time Δ1 and Δ2 were calculated. These results were indicated in Table 1.

(3) Pellet No. 13

With regard to the treatment for reducing the amount of ε-caprolactam contained in nylon 6, the temperature of the treatment was altered to 60° C. and agitating time underwater was altered to 4 hours. Tens part of nylon 6 after the treatment and 90 parts of EVOH-based resin were dryblended to prepare a resin composition. Thus prepared resin composition was pelletized in the same manner as No. 1 to obtain pellet No. 13.

The amount of ε-caprolactam contained in the pellet No. 13 was determined according to the above-mentioned method. The measurement value was 120 ppm. The pellet No. 13 was measured with respect to complex viscosity and calculated with respect to rate of variation with time Δ3 in the same manner as No. 11.

TABLE 1

| Resin composition No. | Amount of ε-caprolactum (ppm) | Complex viscosity (Pa · s) | | | Long-run moldability (rate of variation of complex viscosity with time) | |
|---|---|---|---|---|---|---|
| | | After 5 minutes η(5 min) | After 8 hours η(8 hr) | After 7 days η(7d ay) | Δ1 = η(8 hr)/η(5 min) | Δ2 = η(7 day)/η(5 min) |
| 1 | 61 | 1250 | 89600 | 3640000 | 72 | 2910 |
| 2 | 240 | 1260 | 93400 | 3770000 | 74 | 2990 |

From the Table 1, it is understood that the pellet of resin composition No. 1, which was subjected to a treatment of contacting with water, was reduced in an amount of ε-caprolactam contained in the pellet.

From FIG. 1, there is almost no remarkable difference in complex viscosity between No. 1 and No. 2 from the beginning of applying shear force up to the first about 200 minutes, after which the difference gradually grew.

The pellet of resin composition No. 2 which was 73 or more in a rate of variation with time Δ1 may be expected that the rate of variation with time Δ2 after 7 days would reach around 3000. While the pellet of resin composition No. 1 which was less than 73 in a rate of variation with time Δ1 may be expected that the rate of variation with time Δ2 after 7 days would reach around 2910.

Accordingly it is expected that the reduction of the amount of ε-caprolactam to 200 ppm or less improves long-run moldability of the resin composition.

[Relationship 2 Between Amount of ε-Caprolactam and Long-Run Moldability]

(1) Pellet No. 11

Pellet No. 11 which was a pellet of the resin composition No. 1 prepared above was measured with respect to complex viscosities after 20 minutes and 6 hours of applying shear force according to the above-mentioned measuring method. The rate of variation with time Δ3 was calculated by the equation below with the measurement results.

Rate of variation with time Δ3=η(6 hr)/η(20 min)

(2) Pellet No. 12

The pellet No. 12, which was a pellet of the resin composition No. 2 prepared above, was measured with respect to complex viscosities after 20 minutes and 6 hours of applying shear force and rate of variation with time Δ3 was calculated in the same manner as the pellet No. 11.

The resin composition pellet No. 12 had a water content of 0.5 wt %. Although No. 12 and No. 2 were prepared from the same resin composition, the pellet No. 12 contained a higher moisture.

(4) Pellet No. 14

With regard to the treatment for reducing the amount of ε-caprolactam contained in nylon 6, the temperature of the treatment was altered to 20° C. and agitating time underwater was altered to 6 hours. Ten parts of nylon 6 after the treatment and 90 parts of EVOH-based resin were dryblended to prepare a resin composition. Thus prepared resin composition was pelletized in the same manner as No. 1 to obtain pellet No. 14.

The amount of ε-caprolactam contained in the pellet No. 14 was determined according to the above-mentioned method. The measurement value was 145 ppm. The pellet No. 14 was measured with respect to complex viscosity and calculated with respect to rate of variation with time Δ3 in the same manner as No. 11.

Complex viscosities and long-run moldability (namely rate of variation of complex viscosity with time) of resin composition pellet Nos. 11 to 14 were indicated in Table 2.

TABLE 2

| Pellet No. | Amount of ε-caprolactum (ppm) | Complex Viscosity (Pa · s) | | Long-run moldability (rate of variation of complex viscosity with time) Δ3 = η (6 hr)/η (20 min) |
|---|---|---|---|---|
| | | After 20 minutes η (20 min) | After 6 hours η (6 hr) | |
| 11 | 61 | 1490 | 42400 | 29 |
| 12 | 240 | 1590 | 55800 | 35 |
| 13 | 120 | 1590 | 48900 | 31 |
| 14 | 145 | 1450 | 44800 | 31 |

From Table 2, it is understood that the complex viscosity of any resin composition was increased with time regardless of the amount of ε-caprolactam. In the case that the amount of ε-caprolactam is 200 ppm or less, the rate of variation with time (Δ3) was suppressed to increase. In the case of the amount of ε-caprolactam is 100 ppm or less, the rate of variation with time (Δ3) was further suppressed to increase.

From these results, it is understood that reduction of the amount of ε-caprolactam contained in the resin composition pellet to 200 ppm or less, preferably 100 ppm or less is effective for the improvement of long-run moldability.

INDUSTRIAL APPLICABILITY

The resin composition containing EVOH-based resin and nylon 6-based polyamide is suitable as a packaging material having superior gas barrier property and sustaining an original shape even after heat treatment, as well as is improved in long-run moldability by adjusting the amount of ε-caprolactam. The adjustment of the amount of ε-caprolactam may be achieved by adding a washing treatment with water which is a simple operation. Accordingly the present invention may efficiently improve long-run moldability of the resin composition containing nylon 6-based polyamide and a conventional EVOH-based resin.

The invention claimed is:

1. A method for producing a melt-molded article comprising a resin composition comprising a saponified ethylene-vinyl ester-based copolymer and nylon 6-based polyamide, the method comprising
   a process of contacting the nylon 6-based polyamide with water having a temperature of 20 to 60° C. for 10 minutes to 24 hours;
   wherein ε-caprolactam is contained in the resin composition at a concentration of 10 to 200 ppm;
   wherein a ratio of the amounts in weight of the saponified ethylene-vinyl ester-based copolymer to the nylon 6-based polyamide (saponified ethylene-vinyl ester-based copolymer:nylon 6-based polyamide) in the resin composition is from 50:50 to 90:10;
   mixing the saponified ethylene-vinyl ester-based copolymer and nylon 6-based polyamide;
   to form a resin composition having a water content of greater than 0.15% by weight to 1% by weight; and
   melt-molding the resin composition having a water content of greater than 0.15% by weight to 1% by weight to form the melt-molded article.

2. The method for producing a melt-molded article according to claim 1, wherein the contact process is carried out at any one of i)-iv) shown below:
   i) prior to mixing the saponified ethylene-vinyl ester-based copolymer with the nylon 6-based polyamide;
   ii) when mixing the saponified ethylene-vinyl ester-based copolymer with the nylon 6-based polyamide;
   iii) after mixing the saponified ethylene-vinyl ester-based copolymer with the nylon 6-based polyamide;
   or iv) a combination of two or more of i) to iii).

3. The method for producing a melt-molded article according to claim 2, wherein the amount of ε-caprolactam contained in the resin composition is reduced to 10 to 200 ppm by the contact process.

4. The method for producing a melt-molded article according to claim 1, wherein the amount of ε-caprolactam contained in the resin composition is reduced to 10 to 200 ppm by the contact process.

5. The method for producing a melt-molded article according to claim 1, wherein the process of contacting is carried out for 10 minutes to 12 hours.

* * * * *